No. 834,150. PATENTED OCT. 23, 1906.
J. T. MILLS.
VEHICLE SPOKE BOOT.
APPLICATION FILED SEPT. 16, 1905.
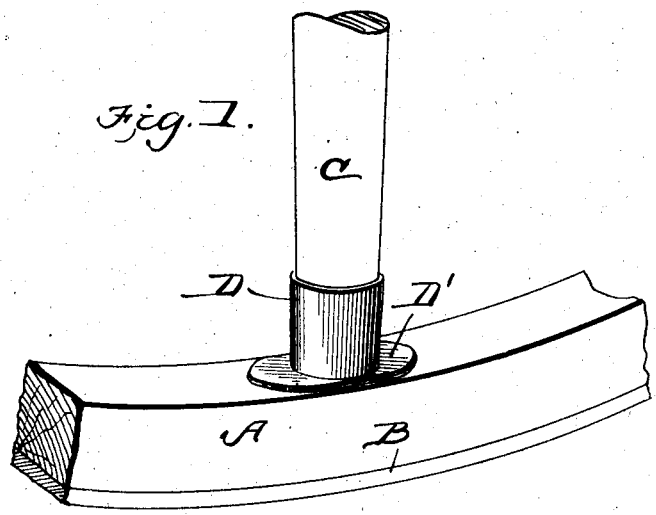
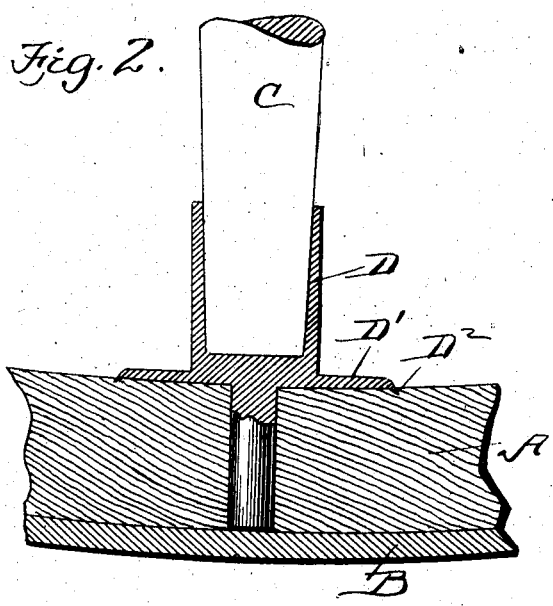
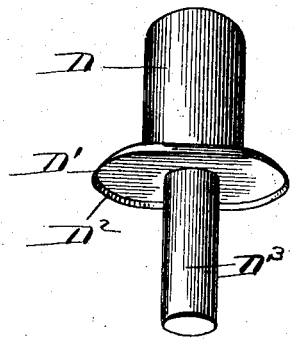
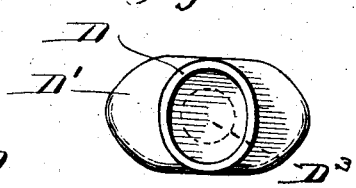
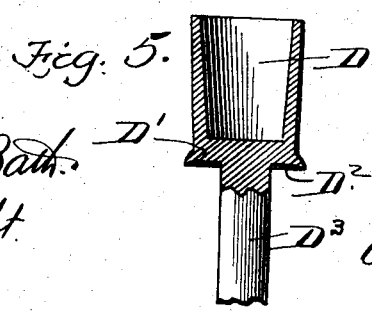
WITNESSES:
C. B. McBath
Geo. P. Wright
INVENTOR
J. T. Mills.
BY
O'Meara & Brock
ATTORNEYS

UNITED STATES PATENT OFFICE.

JOE T. MILLS, OF NEWS FERRY, VIRGINIA.

VEHICLE-SPOKE BOOT.

No. 834,150.  Specification of Letters Patent.  Patented Oct. 23, 1906.

Application filed September 16, 1905. Serial No. 278,788.

*To all whom it may concern:*

Be it known that I, JOE T. MILLS, a citizen of the United States, residing at News Ferry, in the county of Halifax and State of Virginia, have invented a new and Improved Vehicle-Spoke Boot, of which the following is a specification.

This invention relates to a boot or socket designed to connect a vehicle-spoke with a felly or rim.

The object of the invention is to strengthen both the spoke and felly and to avoid the danger of the reduced end of the spoke breaking off in the felly, as is often the case, owing to the fact that this is one of the weak points in a spoke.

My invention consists of the novel features of construction hereinafter described, pointed out in the claims, and shown in the accompanying drawings, in which—

Figure 1 is a perspective view showing the application of my invention. Fig. 2 is a longitudinal section through a portion of a rim and tire and showing my spoke-boot in place, partly in section and partly in elevation. Fig. 3 is a detail perspective view of the spoke-boot. Fig. 4 is a plan view. Fig. 5 is a vertical section, a portion of the tenon being in elevation.

In the drawings, A represents the felly, and B the tire, of a vehicle-wheel provided with a spoke C, which may be of any suitable construction, but in which the usual tenon is omitted.

My spoke-boot consists of the cylindrical socket-piece D, of any size and suitable material, which is adapted to receive the outer end of a spoke and which is provided with a flanged base D′, preferably oval in outline, as shown in Fig. 4, and the edges of which are turned down, as shown at D², and which bite into the felly, as shown in Fig. 2. The boot is also provided with a centrally-arranged solid tenon D³, which fits in a suitable bore formed in the felly and the outer end of which bears against the inner face of the tire B. By this construction the spoke is firmly held in place, and it is not necessary to reduce the end of the spoke and fit the same into the felly, and the spoke is not, therefore, weakened at the end, and the felly is also strengthened, for the reason that the metal tenon D³ can be of less diameter than the usual spoke end, and the flanged base D′ provides a larger bearing-surface than the ordinary shoulder formed upon a spoke.

Having thus fully described my invention, what I claim, and desire to secure by Letters Patent, is—

1. A socket of the kind described provided with an oval-shaped flange having turned-down edges, and a solid centrally-arranged tenon.

2. A device of the kind described comprising in combination with a felly having a transverse bore, a socket having a flanged base, the edges of which are adapted to rest upon and bite into the felly, a tenon adapted to fit in the transverse bore, and a spoke adapted to fit snugly in the socket.

JOE T. MILLS.

Witnesses:
 FRED. H. YANCEY,
 R. A. CARTER.